July 2, 1968  N. R. BROWNYER  3,390,593
TRACTION EQUALIZER

Filed March 2, 1966  2 Sheets-Sheet 1

INVENTOR
NELSON R. BROWNYER

United States Patent Office 3,390,593
Patented July 2, 1968

3,390,593
TRACTION EQUALIZER
Nelson R. Brownyer, Birmingham, Mich., assignor, by mesne assignments, to Rockwell Standard Company, Pittsburgh, Pa., a corporation of Delaware
Filed Mar. 2, 1966, Ser. No. 531,145
7 Claims. (Cl. 74—710.5)

ABSTRACT OF THE DISCLOSURE

A limited slip differential in which differentiation between the speed of a pair of side gears and the differential casing is normally prevented by a pair of clutches constantly engaged by independent springs, the force maintaining engagement of the clutches being independent of driving torque, and retainers for holding each clutch in place and preventing outward displacement of the associated side gear.

---

The present invention refers to differential mechanisms such as employed in interaxle or final drives of automotive vehicles and more particularly to differentials equipped with friction-type clutches.

Automotive differential mechanisms in which differential action is reduced or eliminated under adverse driving conditions have been of several types. For example, it has been proposed to inactivate the differential through manually activated lock-out devices. Such devices place an undue burden on the driver and are susceptible of misuse. Other structures provide automatic cam or friction means or a combination of both to lock-out the differential or to retard differential action when one wheel loses traction. Those devices are usually complicated, expensive and subject to rapid wear. They often require separate trigger means to produce friction, as for instance: intricate teeth design to produce side thrust, slip clutch teeth, slip means on the pinion spider pins to shift the pinions into the side gears, etc.

In other systems retarding agents (such as heavy oil, silicones, etc.) or friction means are employed to prevent differential action automatically under certain circumstances. However, fluid filled differentials are difficult to seal reliably and the provision of the exact amount of space to enable the fluid to become an effective retarding agent poses difficult interior design problems.

The present invention is concerned with automatic differential lock-out or retarding means embodying improved structures which eliminates the inherent disadvantages of prior units.

Accordingly, it is an object of the present invention to provide friction means for an automotive differential to lock-out or retard differential action automatically under certain circumstances.

Another object is the provision of frictional retarding means within a differential case which allows a limited amount of differential action when both wheels have equally good traction but which immediately prevents differentiating when one or both wheels lose traction.

Still another object is the provision in a differential of a disc type clutch between the side gears and the differential housing to introduce friction and in such a way as not to transfer torque from one wheel to the other when one wheel loses traction.

A further object is to provide in a differential mechanism a disc type clutch having a predetermined built-in constant friction to allow limited differential action under normal conditions but preventing differential action under no-traction conditions of either wheel.

A still further object lies in the provision of disc type clutches in a differential individually constantly biased into engagement to provide a predetermined amount of built-in friction by means of Belleville type plate springs.

Another object is the provision of a pre-loaded friction type clutch in a differential to retard or inactivate differential action which eliminates the need for a complicated actuator such as intermittent cam means.

Other objects and novel features will become evident by the following detailed description in connection with the attached drawings in which.

Although the present invention is illustrated as incorporated in a truck or passenger car driving axle it will be understood that it may be employed in interaxle or third differentials such as used in multi-wheel driven vehicles.

Figure 1:
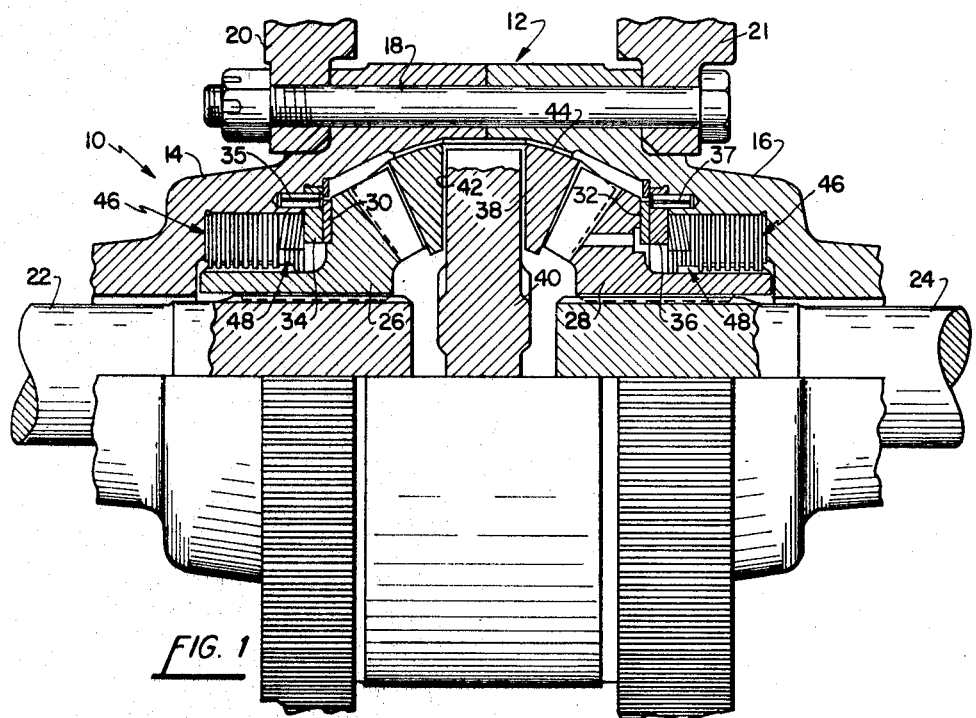
FIGURE 1 is a longitudinal cross-section through an automotive differential mechanism embodying the present invention.

With reference to FIGURE 1, 10 indicates a differential gear mechanism usually installed in the carrier of a vehicle drive axle (not shown). Differential gear mechanism 10 is enclosed in a casing 12 which may be made of two parts 14 and 16 and secured together by a number of bolts 18 which also attach the usual driving ring gears 20, 21 to the casing. The casing parts 14 and 16 are axially aligned and bored through to receive axle drive shafts 22 and 24 extending in opposite directions outwardly therefrom to drive the vehicle wheels (not shown). The inner ends of the drive shafts 22 and 24 are splined to receive bevel side gears 26 and 28 which are prevented from axial displacement outwardly by thrust washers 30 and 32, respectively, placed in the casing between the upper rear face of the side gears and retainer plates 34, 36 securely attached inside of the casing by roll pins 37 or the like.

Side gears 26 and 28 mesh with a number of identical bevel pinions 38 supported on a pin or spider cross 40 centrally located within the casing 12 and conventionally attached thereto. The pinions 38 are rotatably supported on spider 40 for limited floating movement (the clearance being shown at 42) to allow the pinions to adjust for a balanced driving condition. The back faces of the pinions 38 are in bearing contact with the usual washers 44 positioned between them and the adjoining case halves 14 and 16.

To introduce a predetermined amount of friction to retard differential action the differential is equipped with multiple plate identical clutch units 46 individually pre-loaded by spring assemblies 48 positioned between the side gears 26 and 28, respectively, and the inner housing walls of the casing parts 14 and 16.

Figure 2:
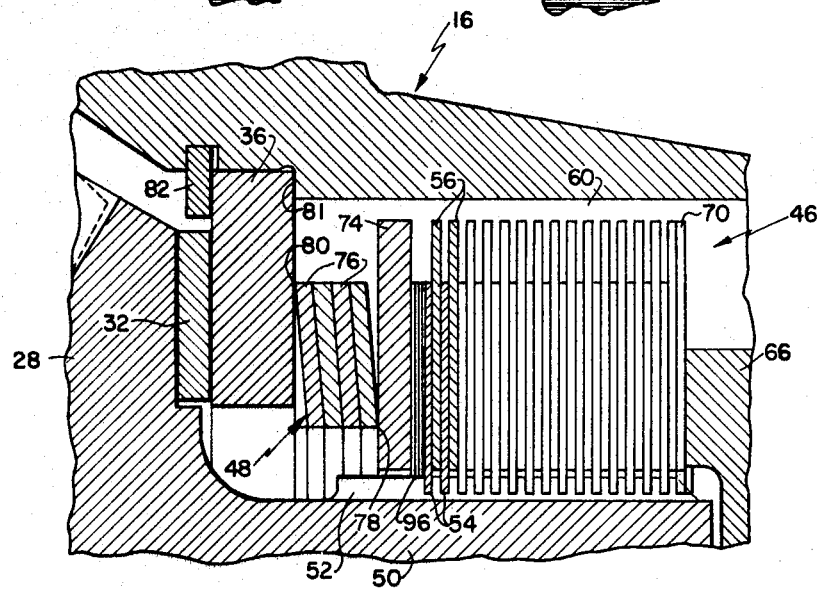
FIGURE 2 is an enlarged section of one of the disc clutch units of FIGURE 1.

Clutch units 46 will now be described in detail with further reference to FIGURE 2. The side gears 26 and 28, respectively, are provided with extended hub portions 50 splined to the axle shafts 22 or 24, respectively, which are also provided with external splines 52 which receive a number of clutch discs 54 which extend into a recessed section of the casing parts 14 or 16, respectively, outwardly of the side gears 26 or 28. Clutch discs 54 are alternately in frictional contact with externally splined clutch discs 56 which peripherally engage corresponding splines or recesses 60 machined or cast in the casing parts 14 or 16, respectively, to prevent rotation of the discs relative to the casing. The outer end of the pack of clutch discs is compressed against a wear ring 70 between the clutch and the inside face of the wall 66 of the casing. The inner end of the clutch pack abuts against a relatively thicker pressure plate 74 which is also retained in the casing recesses 60.

The clutch unit 46 is pre-loaded and maintained under preload by the individual spring assemblies 48 which comprise a number of Belleville type plate springs 76 (four in this instance). The plate springs 76 are nested together and assembled into the clutch in such way that the crown 78 of the outer spring abuts the pressure plate 74 and the rim 80 of the inner spring abuts the inner face of the retainer plates 34 or 36.

The retainer plates 34, 36 abut shoulders 81 provided in the casing parts 14, 16 to squarely align the plates within the casing. Internal lock rings 82 keep the retainer plates against their respective casing shoulders 81.

The compression of the clutch unit 46 by the spring assembly 48, which is constant once it is established, is such that slippage between the clutch discs will occur under certain circumstances, i.e., when rounding a curve. Thus, the clutches do not interfere with the normal steering characteristics of the vehicle when both driving wheels have sufficient traction and sufficient differential action is provided to allow differentiating under normal conditions and when both wheels have equally good traction. Under all other circumstances, the differential is locked up so that both axle drive shafts turn in unison and torque tends to be equally divided between them. If one wheel loses traction, the other wheel which still has sufficient traction, receives driving torque enabling the vehicle to be driven away. Wear on the clutch discs 54 and 56, which could change the compression rate of the spring assembly 48, is normally negligible since, as explained before, limited slip occurs infrequently.

The spring rate characteristic of the spring assemblies 48 may be easily changed by altering the crown height of the plate springs 76 or changing the thickness of the plates or by installing more or less plate springs, thus easily providing for a variety of application requirements.

A specific feature of the present invention lies in the provision of separate individual spring assemblies for each clutch unit. It is known to provide compression for both clutch units in a differential by the same springs located between the opposite clutches. This is undesirable, since only half the force of the springs is applied to each clutch, necessitating the use of an excessive number of springs or especially strong and heavy springs, which frequently cannot be accommodated in the available space, to achieve the same results as in the present invention. Furthermore, coil springs, which have to be used in such constructions, are more likely to undergo a change in spring characteristics and are extremely difficult to install in compressed condition. In addition, the interconnecting springs can affect clutch balance and slip forces from one clutch may be transferred to the other. These disadvantages have been overcome in the present invention by the use of individual plate spring packs which are easy to install, need only little space and do not upset clutch balance.

Figure 3:
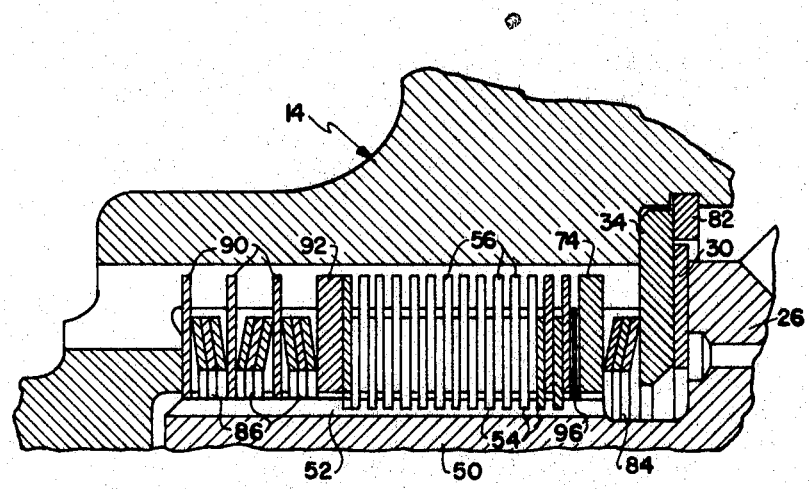
FIGURE 3 is a fragmentary section illustrating an alternate arrangement of Belleville discs and clutch plates.

With reference to FIGURE 3, in this alternate clutch arrangement a number of individual Belleville spring packs are provided on both sides of the friction discs. In this instance one spring pack 84 is assembled inwardly of the friction disc assembly between the pressure plate 74 and the retainer plate 34 or 36 as in FIGURES 1 and 2. The remaining spring packs 86 are arranged outwardly of the friction disc assembly in alternate position relative to each other and separated from each other and the casing wall by spacers 90 splined to the casing. Another pressure plate 92 similar to pressure plate 74 is positioned between the outer spring packs and the outer end of the friction disc assembly to transfer the spring forces to the friction disc assembly.

Figure 4:
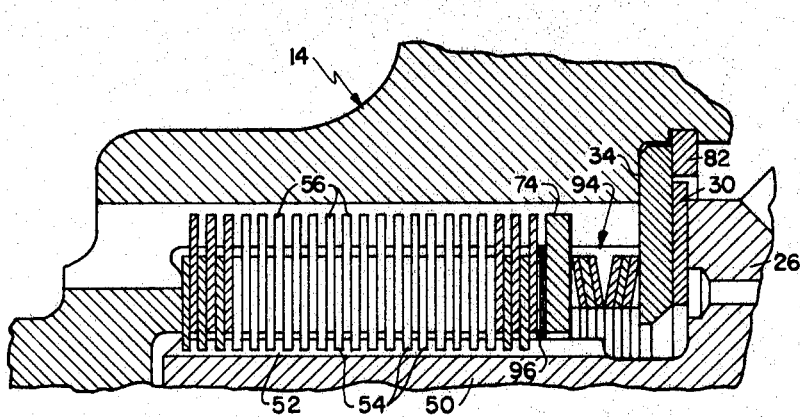
FIGURE 4 is a similar view showing another embodiment of the invention.

A still further embodiment is illustrated in FIGURE 4 in which a dual spring pack assembly 94 is assembled back-to-back at the inner end of the friction disc assembly between the pressure plate 74 and the retainer plate 34 or 36.

The FIGURE 3 and 4 embodiments are designed for heavy duty applications, such as off the road vehicles, and the particular multiple spring pack arrangement provides improved wear characteristics for the friction discs to considerably prolong their effective life.

In all embodiments of the present invention a suitable number of shims 96 may be installed at either end of the clutch where necessary to compensate for manufacturing tolerances and to obtain the desired spring load for any particular application.

It will be noted that axial side gear thrust when the differential is operating does not influence the operating characteristic of the clutch assemblies since the thrust from the side gears 26, 28 is transferred by the thrust washers 30, 32 and the retainer plates 34, 36 to the casing part 14, 16. Thus, the differential action retarding mechanism of the present invention does not depend on functions of the drive components of the differential but is entirely dependent on its built-in predetermined pre-load.

Thus, there has been provided an effective, relatively simple and inexpensive differential action retarding mechanism which is easily installed, not subject to excessive wear and which does not require any significant changes in the basic differential casing structure.

Furthermore, the differential clutch mechanism of the present invention is wholly automatic and does not depend on gear side thrust or intermittent cam action to be triggered into actuation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A limited slip differential mechanism comprising a driven casing, a plurality of pinions carried by said casing, a pair of aligned output shafts rotatable in said casing, side gears meshing with said pinions, said side gears being drivingly connected to the inner ends of said shafts, retainer means carried by said housing for holding said side gears against axial movement outwardly of said shafts, a pair of friction clutch assemblies within said casing, each adapted, when engaged, to resist relative rotation between one of said shafts and said casing, first annular plate spring means constantly urging one of said clutch assemblies into engaged position, and second annular plate spring means independent of said first annular plate spring means constantly urging the other clutch into engaged position, said retainer means being effective to hold each of said spring means and said clutch assemblies in position within said housing.

2. The combination according to claim 1 wherein said clutches are disc clutches each having one set of discs non-rotatably connected to said casing and another set of discs non-rotatably connected to one of said shafts.

3. The combination according to claim 2 wherein said first and second spring means each comprise a single stack of Belleville type spring plates positioned between the inner end of one of said clutches and an abutment rigid with said casing, the outer ends of said clutches abutting a surface of said casing.

4. The combination according to claim 2 wherein said first and second spring means each comprise a stack of Belleville type spring plates positioned between the inner end of one of said clutches and an abutment rigid with said casing, and a plurality of stacks of Belleville type spring plates positioned between the outer ends of one of said clutches and an abutment rigid with said casing.

5. The combination according to claim 2 wherein said first and second spring means each comprise two stacks of Belleville type spring plates, said stacks abutting each other, one of said stacks abutting an abutment rigid with said casing and the other stack abutting the inner end of one of said clutch assemblies.

6. A limited slip differential mechanism comprising a driven casing, a plurality of pinions carried by said casing, a pair of aligned output shafts rotatable in said casing, side gears meshing with said pinions, said side gears being drivingly connected to the inner ends of said shafts, means forming a pair of inwardly facing radially extending annular shoulders in said casing in surrounding relation with said output shafts outwardly of said side gears, a pair of annular retainer plates each abutting against one of said shoulders and projecting inwardly therefrom, means carried by said casing for preventing movement of said retainer plates away from said shoulders, said retainer plates being positioned opposite portions of said side gears to thereby prevent movement of said side gears axially outwardly along said shafts, said casing having a pair of annular recesses in surrounding relation, respectively, to said output shafts axially outwardly of said retainer plates, a friction clutch assembly within each of said recesses, said friction clutch assemblies each being adapted, when engaged, to resist relative rotation between one of said shafts and said casing, first spring means in one of said recesses constantly urging one of said clutch assemblies into engaged position and second spring means in the other recess constantly urging the other clutch into engaged position, the clutch assemblies and said spring means being held in said recesses by said retainer plates.

7. A limited slip differential mechanism comprising a driven casing, a plurality of pinions carried by said casing, a pair of aligned output shafts rotatable in said casing, side gears meshing with said pinions, said side gears being drivingly connected to the inner ends of said shafts, a pair of friction clutch assemblies positioned within recesses in said casing, each adapted, when engaged, to resist relative rotation between one of said shafts and said casing, first spring means within one of said recesses constantly urging one of said clutch assemblies into engaged position, a second spring means in the other recess independent of said first spring means constantly urging the other clutch into engaged position, and a pair of annular retainers carried by said housing and positioned, respectively, between one of said side gears and the associated spring and clutch assembly, said retainers being effective to prevent movement of said side gears axially outwardly along said shafts and to retain said spring and clutch assemblies in their respective recesses.

References Cited

UNITED STATES PATENTS

| | | | |
|---|---|---|---|
| 1,750,981 | 3/1930 | Wildhaber | 74—711 |
| 2,855,805 | 10/1958 | Fallon | 74—711 |
| 3,264,901 | 9/1966 | Ferbitz et al. | 74—711 |

FOREIGN PATENTS

| | | |
|---|---|---|
| 927,924 | 6/1963 | Great Britain. |
| 996,163 | 6/1965 | Great Britain. |

FRED C. MATTERN, Jr., *Primary Examiner.*

ARTHUR T. McKEON, *Examiner.*